(12) United States Patent
Sorenson et al.

(10) Patent No.: US 9,354,095 B2
(45) Date of Patent: May 31, 2016

(54) MODULAR FLOW SENSOR

(71) Applicant: Honeywell International Inc., Morristown, NJ (US)

(72) Inventors: Richard C. Sorenson, Columbus, OH (US); Andrew J. Milley, Hilliard, OH (US); William Hoover, Plain City, OH (US); Jamie Speldrich, Freeport, IL (US)

(73) Assignee: Honeywell International Inc., Morris Plains, NJ (US)

( * ) Notice: Subject to any disclaimer, the term of this patent is extended or adjusted under 35 U.S.C. 154(b) by 643 days.

(21) Appl. No.: 13/633,446

(22) Filed: Oct. 2, 2012

(65) Prior Publication Data

US 2014/0090464 A1  Apr. 3, 2014

(51) Int. Cl.
*G01F 1/684* (2006.01)
*G01F 5/00* (2006.01)
*G01F 15/14* (2006.01)
*G01F 15/18* (2006.01)

(52) U.S. Cl.
CPC ............ *G01F 1/6842* (2013.01); *G01F 5/00* (2013.01); *G01F 15/14* (2013.01); *G01F 15/18* (2013.01); *Y10T 29/49826* (2015.01)

(58) Field of Classification Search
CPC ......... G01F 1/6842; G01F 15/18; G01F 5/00; G01F 15/14
USPC .............................................. 73/273; 29/428
See application file for complete search history.

(56) References Cited

U.S. PATENT DOCUMENTS 4,088,436 A * 5/1978 Alferes ........................ 431/21
4,407,171 A * 10/1983 Hasha .................. G01M 3/022
                                                                73/46
4,523,462 A   6/1985 Kolodjski
(Continued)

FOREIGN PATENT DOCUMENTS

JP    2010230601    10/2010
WO    0161282      8/2001
WO    2011055362   5/2011

OTHER PUBLICATIONS

Search Report for corresponding Application No. 13184976.2 dated Feb. 7, 2014.

(Continued)

*Primary Examiner* — Lisa Caputo
*Assistant Examiner* — Tran M Tran
(74) *Attorney, Agent, or Firm* — Conley Rose, P.C.; Kristin Jordan Harkins

(57) ABSTRACT

The present disclosure relates to modular flow sensor assemblies and methods. The modular flow sensor assembly may include a main sensor body, a first end adapter having a first connection port configuration, and a second end adapter having a second connection port configuration. The main sensor body may include a main housing and a sensor, where the first end adapter is configured to engage the main housing and the second end adapter is configured to engage the main housing. The first end adapter and the second end adapter may be selected from a group of end adapters, wherein at least two of the end adapters has a different connection port configuration. The selected first end adapter and the selected second end adapters may have the same or different connection port configurations. The first end adapter and the second end adapter are configured to be interchangeable end adapters.

20 Claims, 9 Drawing Sheets

(56) References Cited

U.S. PATENT DOCUMENTS

| | | | |
|---|---|---|---|
| 4,549,751 A * | 10/1985 | Grove, Jr. | 285/30 |
| 4,596,140 A | 6/1986 | Dorman et al. | |
| 4,672,997 A * | 6/1987 | Landis et al. | 137/554 |
| 4,691,727 A * | 9/1987 | Zorb et al. | 137/15.03 |
| 4,787,251 A | 11/1988 | Kolodjski | |
| 4,932,241 A * | 6/1990 | Carmody | G01M 3/2853 138/90 |
| 5,070,220 A * | 12/1991 | Glenn | 200/81.9 M |
| 5,291,781 A | 3/1994 | Nagata et al. | |
| 5,336,334 A * | 8/1994 | Johnson | 134/22.12 |
| 5,813,483 A * | 9/1998 | Latham et al. | 175/218 |
| 6,298,734 B1 | 10/2001 | Storer et al. | |
| 6,430,990 B1 * | 8/2002 | Mallet | E21B 47/1025 73/40.7 |
| 6,510,748 B2 * | 1/2003 | Cooper | G01F 1/28 137/360 |
| 6,536,274 B1 | 3/2003 | Zushi et al. | |
| 6,550,324 B1 | 4/2003 | Mayer et al. | |
| 6,644,132 B1 | 11/2003 | Baumoel | |
| 6,655,207 B1 * | 12/2003 | Speldrich et al. | 73/202.5 |
| 6,684,694 B2 | 2/2004 | Fujiwara et al. | |
| 6,779,395 B2 | 8/2004 | Hornung et al. | |
| 6,871,538 B2 | 3/2005 | Fujiwara et al. | |
| 7,100,440 B2 * | 9/2006 | Morisawa et al. | 73/204.22 |
| 7,108,527 B2 * | 9/2006 | Oldfield et al. | 439/176 |
| 7,210,346 B1 | 5/2007 | Hoover et al. | |
| 7,225,685 B2 * | 6/2007 | Kawamoto et al. | 73/861.77 |
| 7,302,862 B2 | 12/2007 | Fujiwara et al. | |
| 7,383,726 B2 | 6/2008 | Ike et al. | |
| 7,422,910 B2 | 9/2008 | Fitzgerald et al. | |
| 7,490,511 B2 | 2/2009 | Mayer et al. | |
| 7,520,051 B2 * | 4/2009 | Becke et al. | 29/832 |
| 7,536,908 B2 | 5/2009 | Wang et al. | |
| 7,549,348 B2 | 6/2009 | Brown et al. | |
| 7,681,461 B2 | 3/2010 | Rosenbaum et al. | |
| 7,757,553 B2 * | 7/2010 | Meier et al. | 73/204.22 |
| 7,765,679 B2 | 8/2010 | Yao et al. | |
| 7,780,343 B2 | 8/2010 | Chen et al. | |
| 7,797,997 B2 | 9/2010 | Wu et al. | |
| 7,866,208 B1 * | 1/2011 | Ueda et al. | 73/204.15 |
| 7,878,216 B2 * | 2/2011 | Tiberghien et al. | 137/614.04 |
| 7,946,186 B2 | 5/2011 | Hoecker | |
| 8,096,193 B2 | 1/2012 | Fink et al. | |
| 8,127,622 B2 * | 3/2012 | Kawakami | G01F 1/58 73/861.12 |
| 8,281,426 B2 * | 10/2012 | Hui | 4/507 |
| 8,480,883 B2 * | 7/2013 | Stimpson | 210/87 |
| 8,578,769 B2 * | 11/2013 | Hucker et al. | 73/273 |
| 2008/0012333 A1 * | 1/2008 | Gauss | 285/399 |
| 2009/0241683 A1 | 10/2009 | Perr | |

OTHER PUBLICATIONS

"D6F-P MEMS Flow Sensor," OMROM Corporation, 6 pages, Downloaded Jan. 31, 2013.

"OEM Flow Sensors for Embedded Applications Model 840200 and 840500," TSI Incorporations, 2 pages, Copyright 2012.

Apollo, "Model FS1015CL," 7 pages, Downloaded Jan. 31, 2013.

Gas Flow Measurement and Control Products, "?MCS100: Chip Pickup Detection Mass-Flow Sensor," 1 page, Downloaded Jan. 31, 2013.

Honeywell, "Novelty Search Report," Honeywell International Inc., 12 pages, Downloaded Jan. 31, 2013.

OEM Flow Sensors, "Flow Instruments," TSI Incorporation, 2 pages, copyright 2010.

OMRON, "MEMS Flow Sensor D6F-A5/D6f-A6," OMRON Corporation Electronic Components Company, 3 pages, Downloaded Jan. 31, 2013.

OMRON, "MEMS flow Sensor: D6F-01A1,-02A1," OMRON Electronic Components LLC., 4 pages, Downloaded Jan. 31, 2013.

Sensirion, "CMOSens® EM1 Mass flow Meter for Gases," Sensirion The Sensor Company, 14 pages, Mar. 2009.

SMC Corporation, "Flow Sencor; Suction Check of Very Small Work peices," SMC Corporation, 28 pages, Copyright 2007. Series PFMV.

Yamatake Corporation, "Specifications," 7 pages, Downloaded Jan. 31, 2013.

* cited by examiner

MODULAR FLOW SENSOR

TECHNICAL FIELD

The present disclosure relates generally to sensors, and more particularly, to flow sensors.

BACKGROUND

Flow sensors often include a sense element that is configured to detect a flow rate of a media passing through a flow channel. Flow rate sensing mechanisms are used in a variety of flow systems for sensing the amount and/or speed of fluid traveling through a system. In large-scale processing systems, for example, flow rate may be used to affect chemical reactions by ensuring that proper feed stocks, such as catalysts and reacting agents, enter a processing unit at a desired rate of flow. Additionally, flow rate sensing mechanisms may be used to regulate flow rates in systems such as ventilators and respirators where, for example, it may be desirable to maintain a sufficient flow of breathable air or provide sufficient anesthetizing gas to a patient in preparation for surgery. Moreover, flow rate sensors are commonly used in a wide variety of other applications including, for example, commercial, automotive, aerospace, industrial, and medical applications, to name a few.

SUMMARY

This disclosure relates generally to sensors, and more particularly, to sensors that are exposed to media during use. Although sensor assemblies are known to exist, there is need for improvement to such sensor assemblies.

Accordingly, in one illustrative embodiment, a modular flow sensing assembly may include a main sensor body or main sense element assembly configured to define a flow channel and having one or more sensors configured to sense fluid flow through the flow channel. The main sensor body or main sense element assembly may be configured to receive one or more end adapters, where the end adapters may be interchangeable. The end adapters may extend the flow channel of the main sensor body and/or the main sense element assembly and may at least partially define a particular connection port configuration.

In some cases, one or more of the interchangeable end adapters may be secured to or about the main sense element assembly. Illustratively, a first end adapter and/or a second end adapter may engage and form a seal with a main housing of the main sensor body or main sense element assembly. The first end adapter may define a first flow channel extension that extends from the flow channel to a first connection port. The second end adapter may define a second flow channel extension from the flow channel to a second connection port.

In some cases, the secured one or more interchangeable end adapters may form at least a portion of an outer housing of the modular flow sensor apparatus. The formed portion of the outer housing may cover at least a portion of the main sense element assembly.

In some cases, the modular flow sensing assembly may be assembled by obtaining a main sensor body or main sense element assembly, where the main sensor body or main sense element assembly may define a flow channel extending from a first end to a second end of the main sensor body or main sense element assembly and may include a flow sensor for sensing fluid flow through the flow channel. One or more end adapters (e.g., a first end adapter and a second end adapter) may be selected from a plurality of different end adapters, where each of the plurality of different end adapters may be configured to extend the flow channel of the main sensor body or main sense element assembly to a corresponding connection port. In some illustrative instances, the plurality of different end adapters may have a common main sense element assembly interface and different connection port configurations. Once the end adapters have been selected, the common main sense element assembly interfaces may be engaged to each other, with the main sensor body or main sense element assembly, and/or about the main sensor body or main sense element assembly to extend the flow channel to the connection ports of the end adapters.

The preceding summary is provided to facilitate a general understanding of some of the innovative features of the present disclosure, and is not intended to be a full description. A full appreciation of the disclosure can be gained by taking the entire specification, claims, drawings, and abstract as a whole.

BRIEF DESCRIPTION OF THE DRAWINGS

The accompanying figures, in which like reference numerals refer to identical or functionally-similar elements throughout the separate views, and which are incorporated in and form a part of the specification, further show several illustrative embodiments and, together with the description, serve to explain the several illustrative embodiments, wherein.

Figure 1:
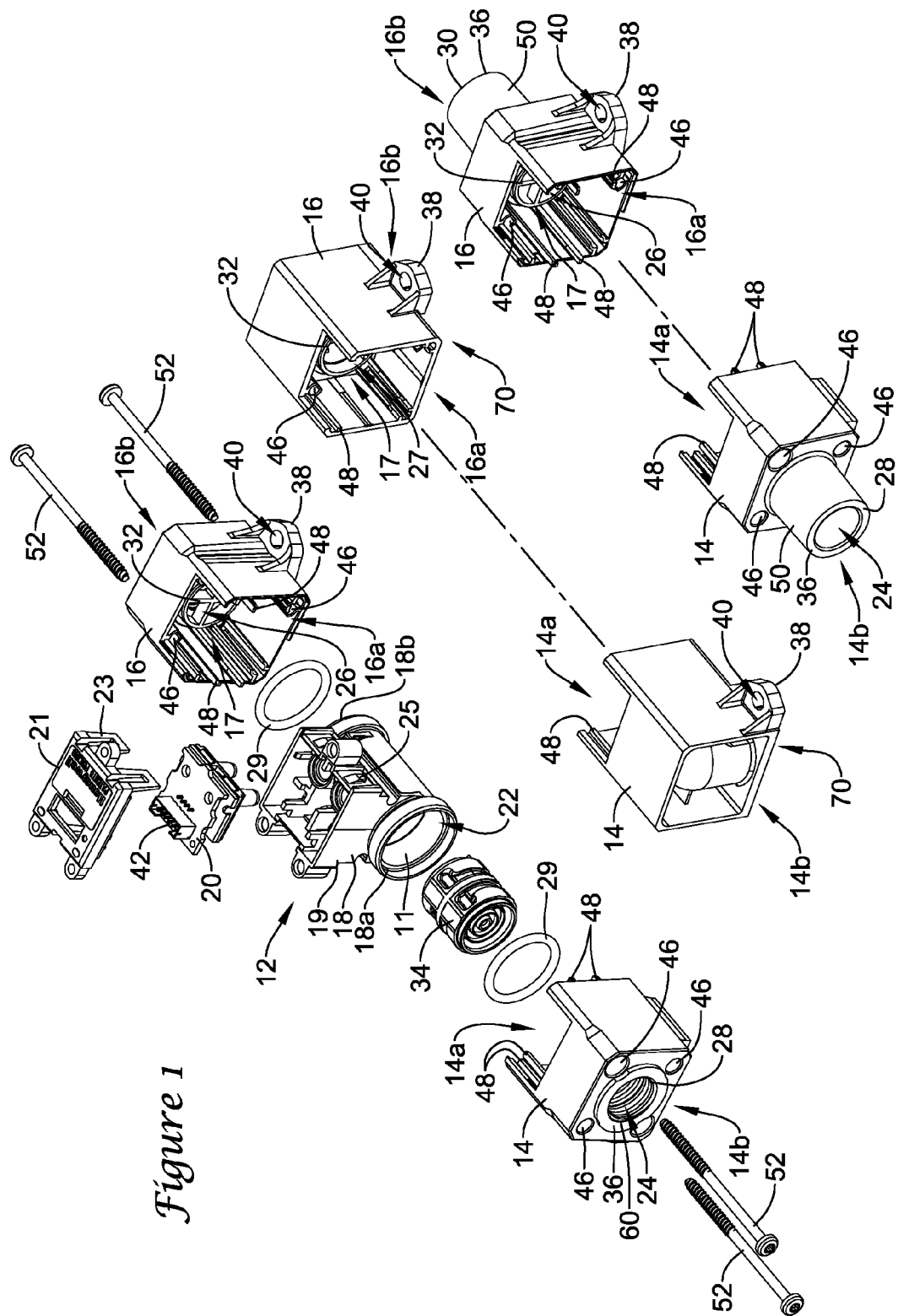
FIG. 1 is a schematic exploded top perspective view of an illustrative modular flow sensing assembly with illustrative interchangeable end adapters.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings, which are not necessarily to scale, depict illustrative embodiments and are not intended to limit the scope of the disclosure. The illustrative embodiments depicted are intended only as exemplary.

FIG. 1 is a schematic exploded perspective view of an illustrative modular flow sensing assembly 10. Generally, modular flow sensing assemblies 10 may be used by various users in any of numerous systems in which flow rate measurement is desired. Some non-limiting examples include ventilator and respirator systems. Instead of tailoring the main sense element assembly or main sensor body of a flow sensing assembly to meet the needs and/or requirements of a user's application or adjusting a user's application to fit the features of the main sense element assembly or main sensor body, the modular flow sensing assembly 10 may be configured to increase users flexibility when interfacing a flow utilizing system with the sensor 20 (e.g., flow sensor) of the modular flow sensing assembly 10 to account for the needs and requirements of various users. Moreover, through the design of the main sense element assembly or main sensor body 12 with interchangeable end adapters 14, 16, both users and manufacturers may be given increased flexibility in the design of their system applications and in the design of their main sense element assembly or main sensor body 12, respectively.

The modular flow sensor or sensing assembly 10 may include a main sense element assembly or main sensor body 12, which may be implemented using an integrated structure or a plurality of components, having an inner surface 11 at least partially defining a flow channel 22; a first end adapter 14; and a second end adapter 16, where the first end adapter 14 and the second end adapter 16 may be interchangeable end adapters. The main sense element assembly or main sensor body 12, the first end adapters 14, and/or the second end adapter 16 may be made of any type of similar or dissimilar material(s) from any type(s) of similar or dissimilar manufacturing process(es), as desired. For example, one or more of the main sense element assembly or main sensor body 12, the first end adapters 14 and/or the second end adapter 16 may be molded and/or made with plastic.

Illustratively, the main sense element assembly or main sensor body 12 may include a main housing 18 and a sensor 20. In some instances, the main sense element assembly or main sensor body 12 may include one or more electrical connectors (e.g., pins 42) for interfacing between the sense element or sensor 20 or electronics of the main sense element assembly or main sensor body 12 and an electrical system configured to communicate the sensor 20 and/or electronics of the main sense element assembly or main sensor body 12. The main housing 18 may have a first end 18a and a second end 18b. The main housing 18 may at least partially define the flow channel 22 extending at least partially from the first end 18a of the main housing 18 to the second end 18b of the main housing 18. Further, in some instances, the main housing 18 may allow fluid to enter the flow channel 22 at one of the first end 18a and the second end 18b of the main housing 18, while allowing fluid to exit the flow channel 22 at the other of the first end 18a and the second end 18b of the main housing 18. In some instances, the sensor 20 may be configured to be received and/or received by the main housing 18, where the sensor 20 may be configured to sense one or more fluids flowing through the flow channel 22 of the main housing 18.

In some cases, the main housing 18 may be configured of one or more piece(s) of material. For example, the main housing 18 may include a body 19 and a cover 21, as shown in FIG. 1. The cover 21 may be configured to engage or connect to the body 19 through any engaging and/or connecting mechanism or technique. For example, the cover 21 may have prongs 23 configured to engage tabs 25 on the body 19 to form a snap connection or other type of connection, as shown in FIGS. 1-8. Alternatively, or in addition, one or more fasteners 44 may be inserted through the cover 21 and the body 19, where the fastener(s) 44 may engage one or more of the cover 21 and the body 19, as shown in FIGS. 1-8. For example, the fasteners 44 may be threaded and may be configured to engage threads on one or more of the cover 21 and the body 19 to fix the cover 21 relative to the body 19 or for any other desired purpose.

Each of the end adapters 14, 16 may have a first end and a second end. For example, the first end adapter 14 may have a first end 14a configured to surround, connect to, and/or engage a portion of the main housing 18, and a second end 14b at least partially defining a first connection port 28, and the second end adapter 16 may have a first end 16a configured to connect to or engage a portion of the main housing 18, and a second end 16b at least partially defining a second connection port 30.

In some cases, one or more of the first ends 14a, 16a of the end adapters 14, 16 may engage the main housing 18 such that the first end adapter 14 and/or the second end adapter 16 may be configured to form one or more portions of the main housing 18 (e.g., an outer portion of the main housing 18 and/or one or more walls of the main housing 18). In addition, or alternatively, one or more of the first end adapter 14 and the second end adapter 16 may be connected to or secured to the main sense element assembly or main sensor body 12 such that the first end adapter 14 and/or the second end adapter 16 may cover at least part of the main sense element assembly or main sensor body 12. To facilitate securing the first end adapter 14 and/or the second end adapter 16 to the main sense element assembly or main sensor body 12, the first end adapter 14 and the second end adapter 16 may have a common main sense element assembly interface 17 configured to connect with the main sense element assembly or main sensor body 12 to form a seal, such as with one or more o-rings 29 therebetween.

Figure 2:
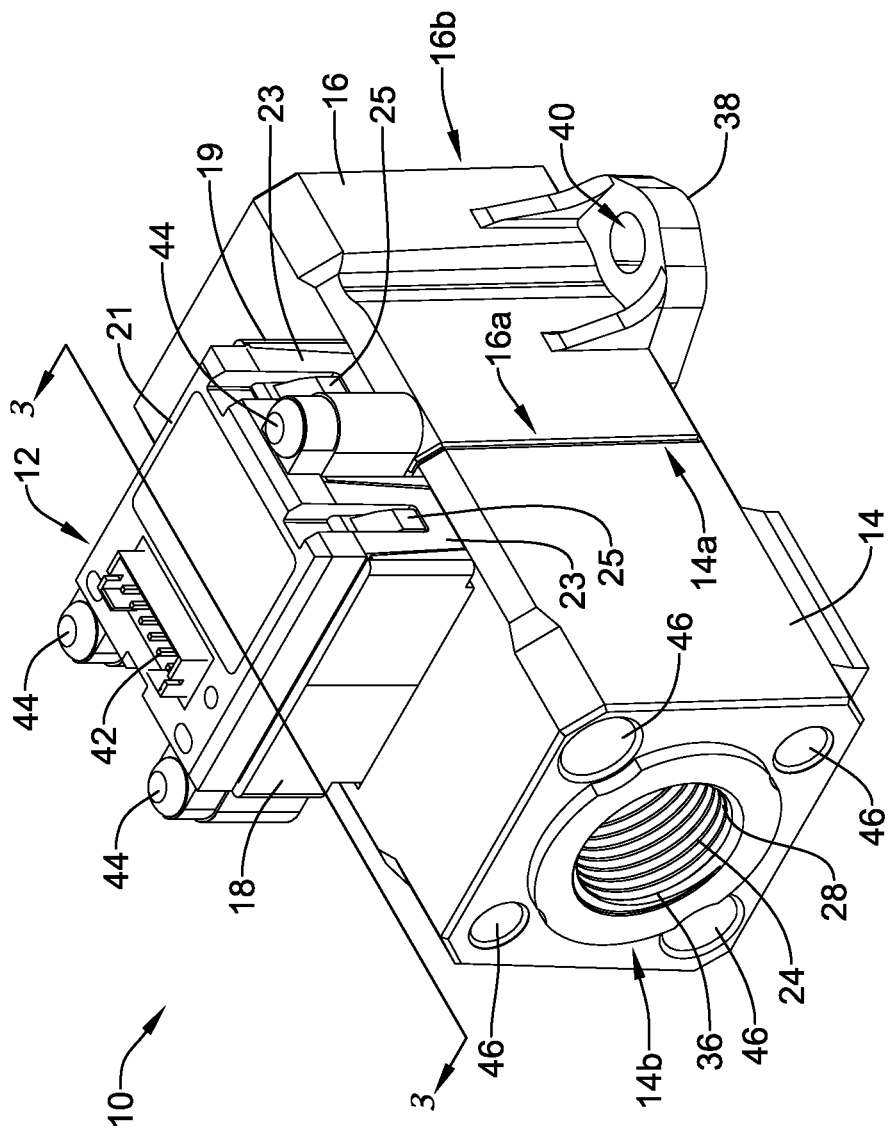
FIG. 2 is a schematic top perspective view of an illustrative modular flow sensing assembly.
Figure 3:
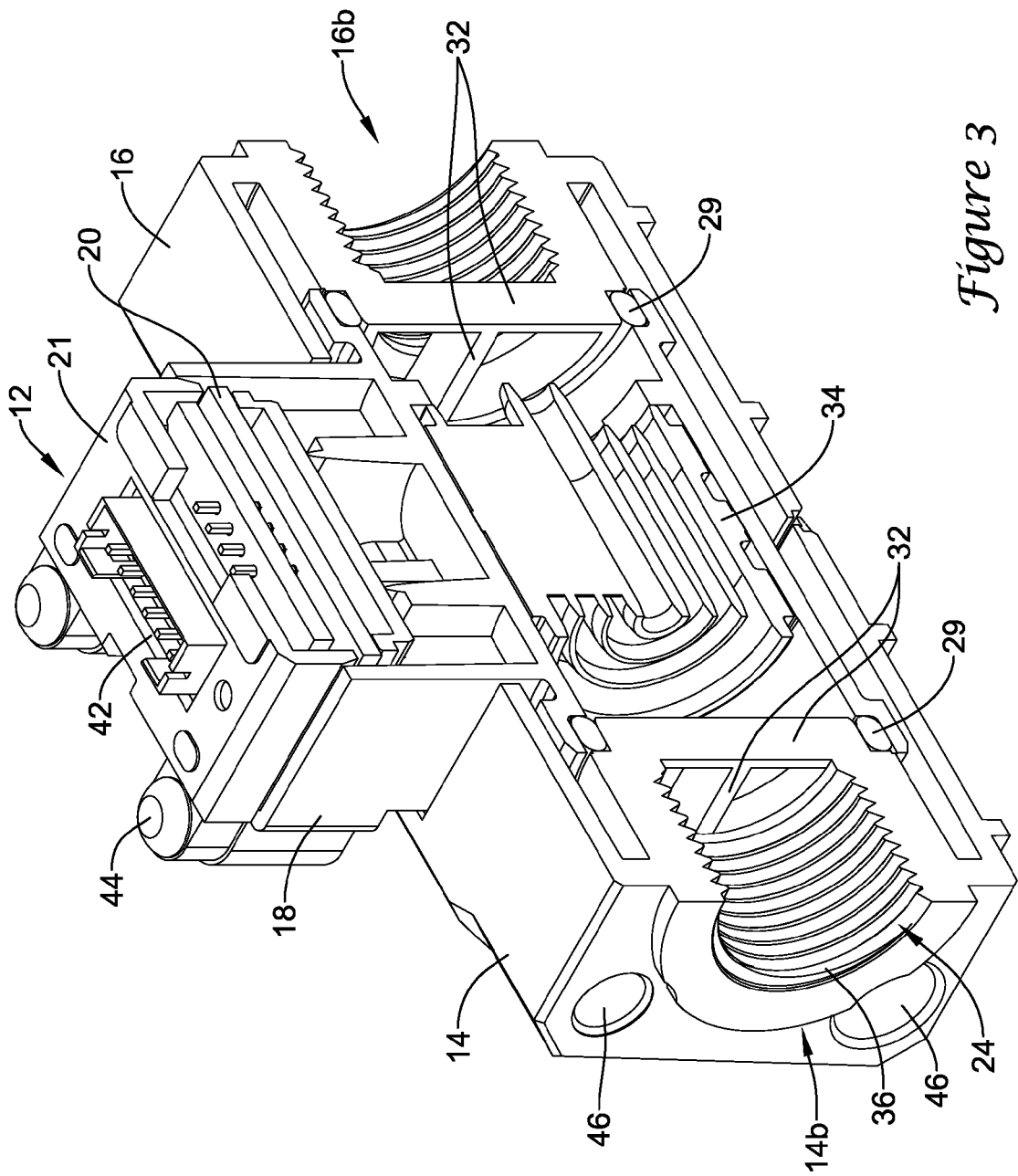
FIG. 3 is a schematic cross-sectional view along line 3-3 of the illustrative modular flow sensing assembly of FIG. 2.
Figure 4:
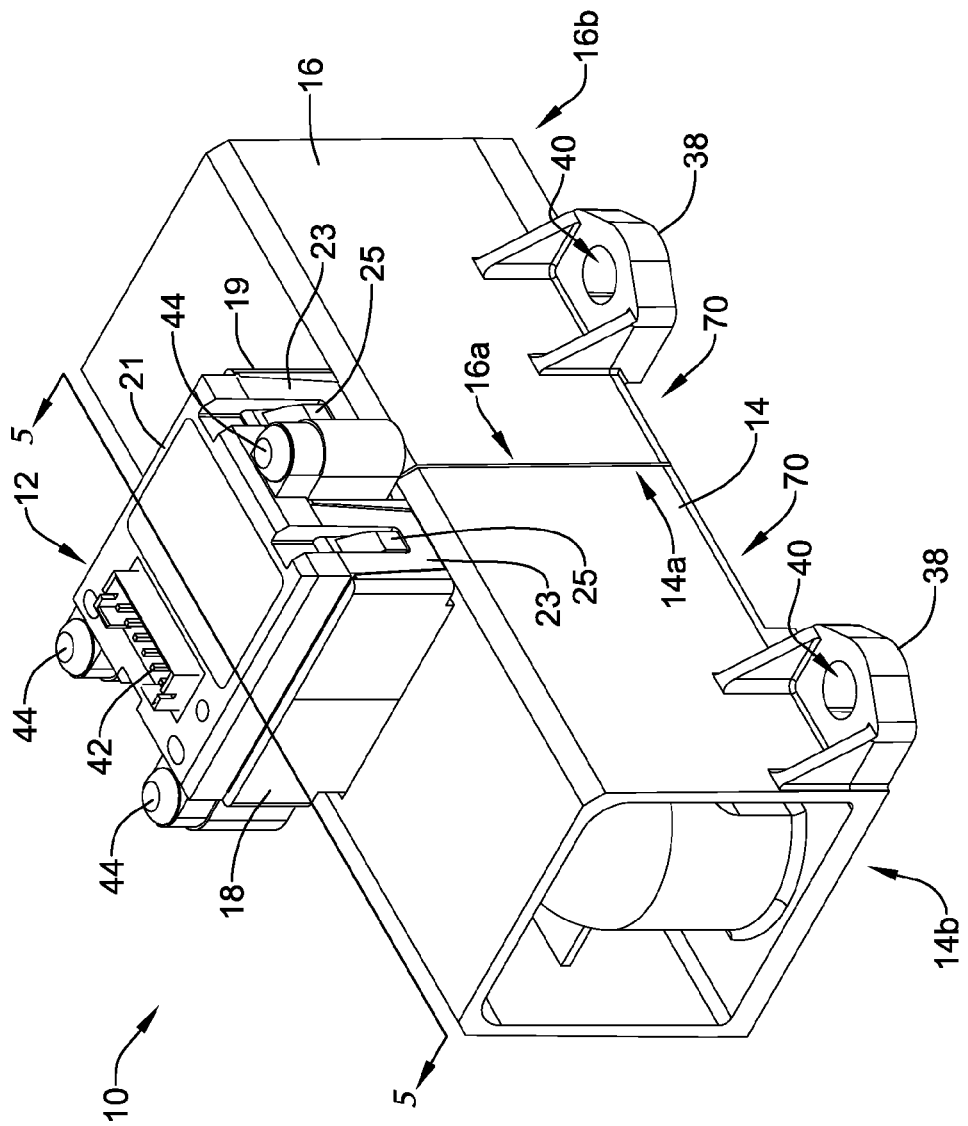
FIG. 4 is a schematic top perspective view of an illustrative modular flow sensing assembly.
Figure 5:
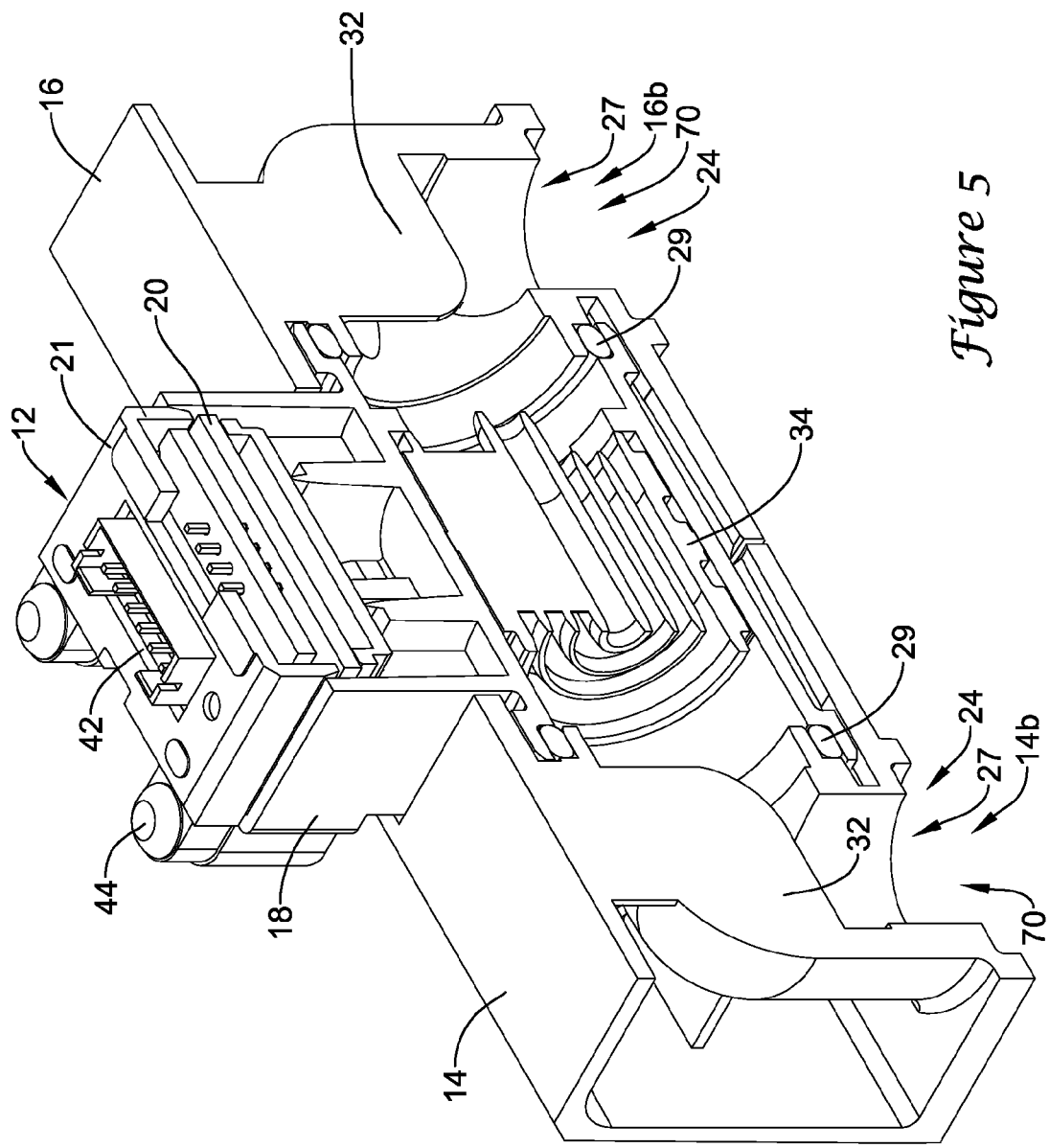
FIG. 5 is a schematic cross-sectional view along line 5-5 of the illustrative modular flow sensing assembly of FIG. 4.
Figure 6:
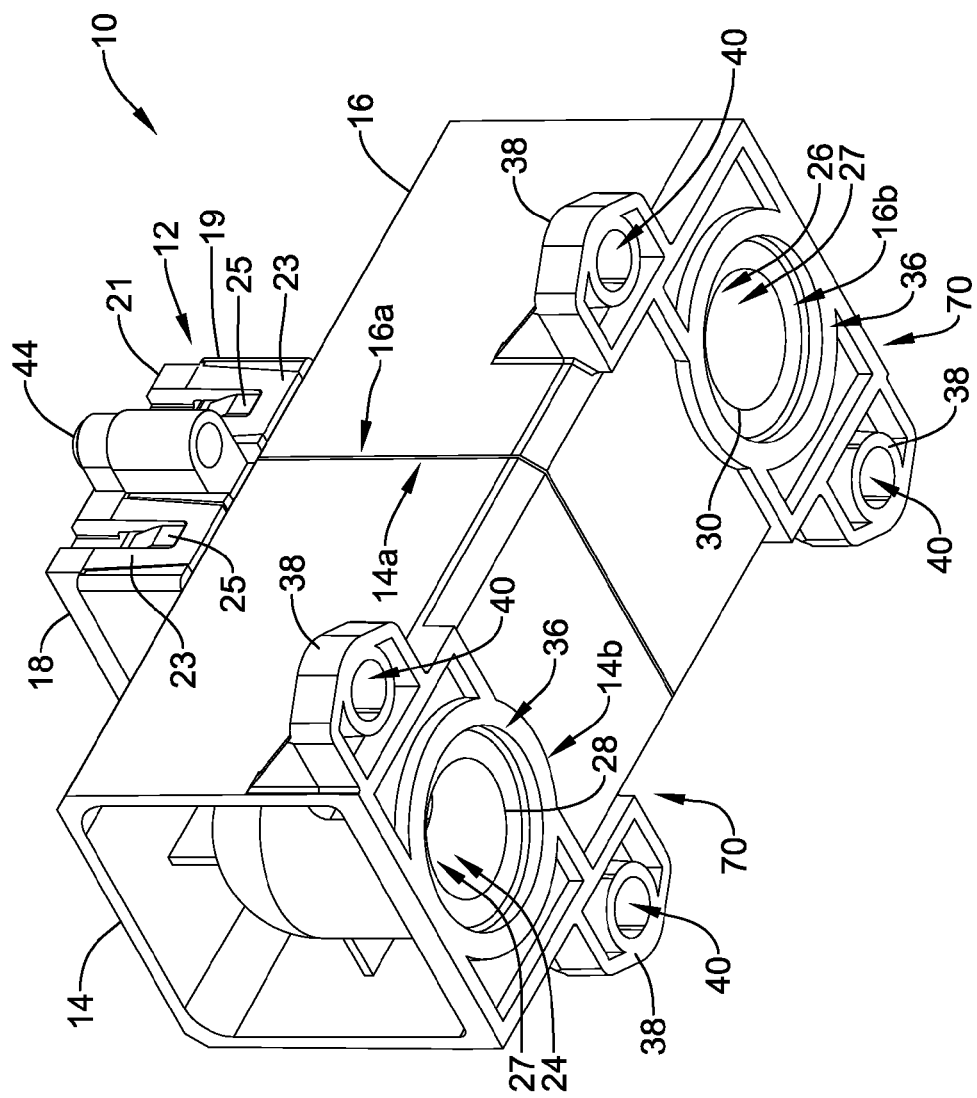
FIG. 6 is a schematic bottom perspective view of the illustrative modular flow sensing assembly of FIG. 4.
Figure 7:
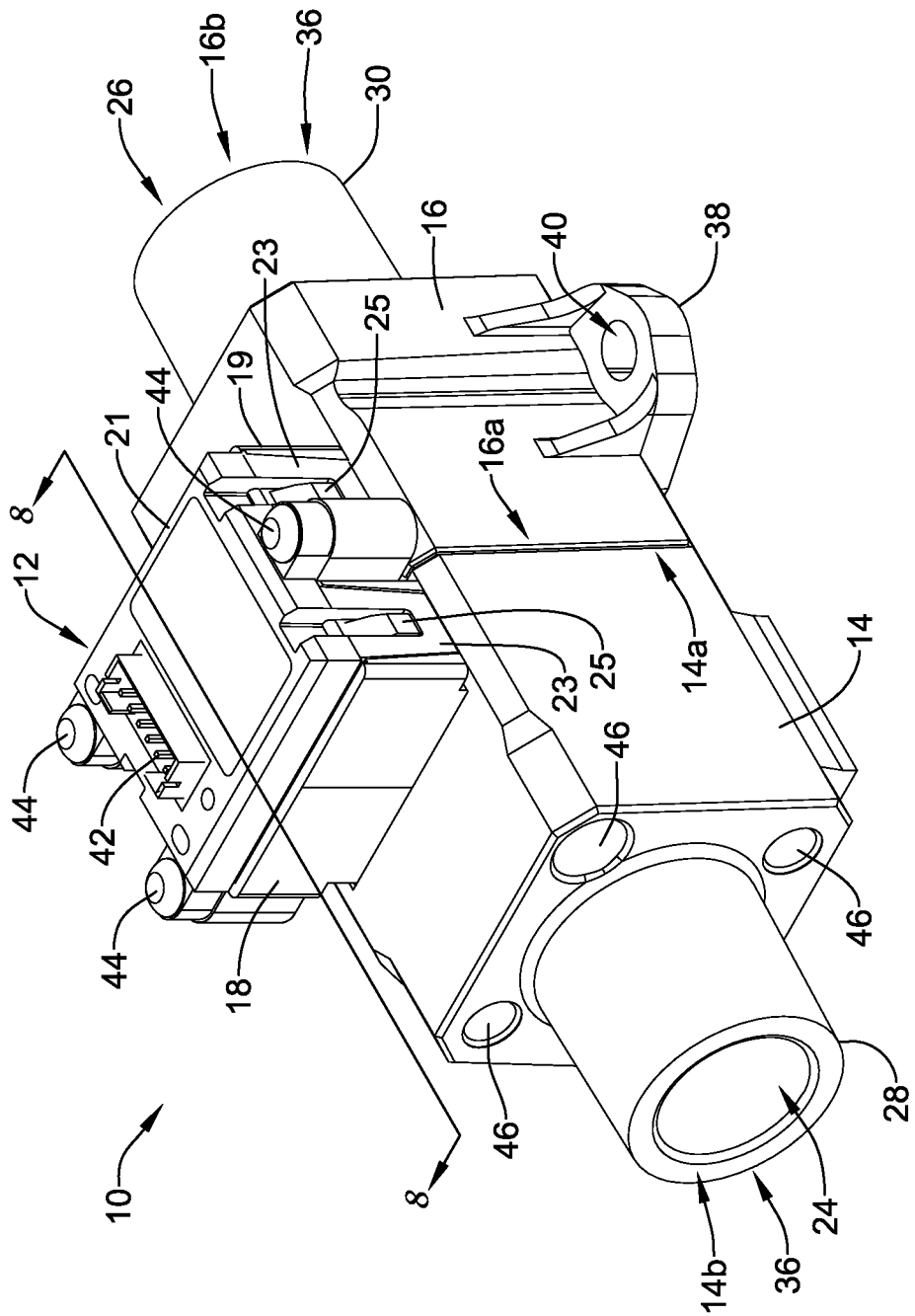
FIG. 7 is a schematic top perspective view of an illustrative modular flow sensing assembly.
Figure 8:
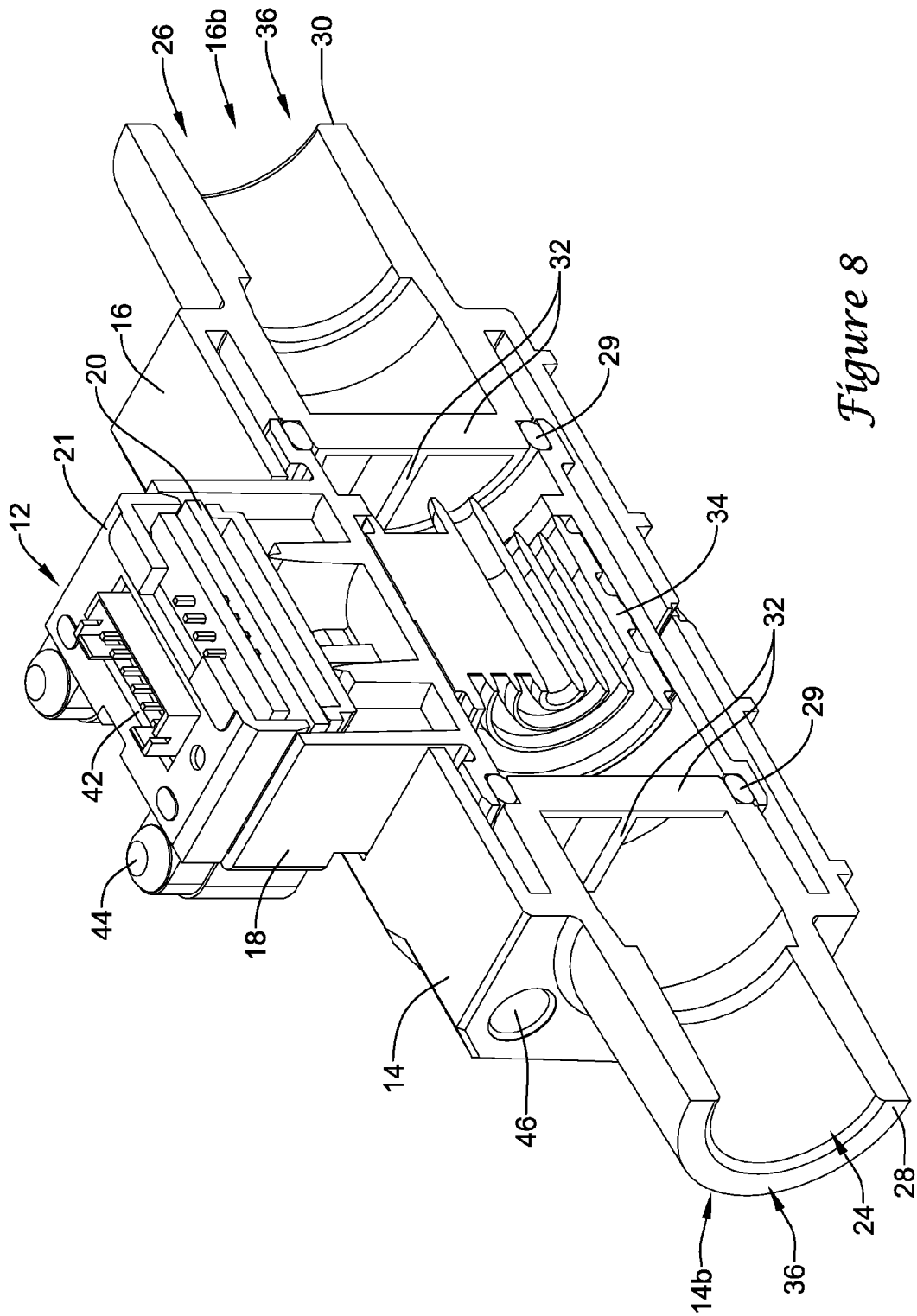
FIG. 8 is a schematic cross-sectional view along line 8-8 of the illustrative modular flow sensing assembly of FIG. 7.

In some instances where the first end adapter 14 and/or the second end adapter 16 surround one or more portions of the main housing 18, one or more end adapter connectors (e.g., a screw, a pin, etc.) may engage the first end adapter 14 and the second end adapter 16, without the end adapter connector(s) engaging the main housing 18. For example, one or more body connectors 52 (e.g., screws) may be inserted through one or more end adapter connector openings 46 in the first end adapter 14 or the second end adapter 16 and the inserted one or more body connectors 52 may be extended into (and engage, for example) one or more end adapter connector openings 46 of the other of the first end adapter 14 or the second end adapter 16 to secure the first end adapter 14 and second end adapter 16 about a portion of the main sense element assembly or main sensor body 12. Where the first end adapter 14 and the second end adapter 16 may be connected by one or more end adapter connectors extending therebetween, the respective main sense element assembly interfaces 17 may contact and interface with the main sense element or main sensor body 12, and the first ends 14a, 16a may be near and/or abut one another as best shown in FIG. 2. In some cases, the main sense element or main sensor body 12 may be positioned to substantially float between and at least partially within the connected first end adapter 14 and second end adapter 16.

The first end 14a of the first end adapter 14 and/or the first end 16a of the second end adapter 16 may have one or more aligning features 48, as shown in FIG. 1, configured to align the first end adapter 14 and the second end adapter 16 with each other and/or with a corresponding aligning feature of the main sense element assembly or main sensor body 12. For example, the aligning features 48 of the end adapters 14, 16 may be configured to engage and align with the aligning features of the main sense element assembly or the main sensor body 12 and/or the aligning features of the other end adapter 14, 16.

In some cases, the first end adapter 14 and the second end adapter 16 may be substantially fixed with respect to the main sense element assembly or main sensor body 12 via any connecting mechanism and/or technique. For example, one or more end adapter connectors may extend through the first end adapter 14 and the second end adapter 16, which may result in the main sense element assembly or main sensor body 12 floating within the connected end adapters 14, 16 and/or being engaged by one or more of the aligning features 48 of the end adapters 14, 16, and/or other features of the main sense element assembly interface 17.

In some instances, the first end adapter 14 and/or the second end adapter 16 may be configured to extend the flow channel 22 of the main housing 18 to respective second ends 14b, 16b of the first end adapter 14 and/or the second end adapter 16. Illustratively, the first end adapter 14 may be configured to engage and/or form a seal with the main housing 18 through the common main sense element assembly interface 17 and o-rings 29, such that the first end adapter 14 may at least partially define a first flow channel extension 24 in fluid communication with the flow channel 22. The first flow channel extension 24 may extend from the flow channel 22 of the main housing 18 to a first connection port 28 of the modular flow sensor assembly 10 that may be positioned at or near the second end 14b of the first end adapter 14.

In some instances and optionally similar to the configuration of the first end adapter 14, the second end adapter 16 may be configured to engage and/or form a seal with the main housing 18 through the common main sense element assembly interface 17, and o-rings 29, such that the second end adapter 16 may at least partially define a second flow channel extension 26 in fluid communication with the flow channel 22. The second flow channel extension 26 may extend from the flow channel 22 of the main housing 18 to a second connection port 30 of the modular flow sensor assembly 10 that may be positioned at or near the second end 16b of the second end adapter 16.

In some cases, each of one or more of the first end adapter 14 and the second end adapter 16 may include one or more fins 32 extending from an interior surface of the first end adapter 14 and/or the second end adapter 16 and into the respective first flow channel extension 24 and/or the second flow channel extension 26, as shown in FIGS. 1, 3, 5, and 8. The one or more fins 32 may take on any shape and/or dimension, as desired. For example, the fins 32 may be configured as a single slice of material extending from an interior surface of the first end adapter 14 and/or the second end adapter 16 into the respective first flow channel extension 24 and/or the second flow channel extension 26, a plus-sign extending substantially to and from the interior surface of the first end adapter 14 and/or the second end adapter 16, or any other shape and dimension made through any manufacturing process (e.g., molding, forming, etc.), as desired. The one or more fins 32 may be configured to precondition the flow by reducing eddy currents of a fluid stream in the flow channel 22 of the main housing 18, laminarizing the flow in the flow channel 22 of the main housing 18, straightening the direction of the flow in the flow channel 22 of the main housing 18, reducing the Reynolds number of the flow in the flow channel 22 of the main housing 18, and/or generally allowing the flow through the flow channel 22 of the main housing 18 to be more consistent than if the fin(s) 32 were not present. Illustratively, where the fins 32 are adopted, the fins 32 may be configured to allow for reduction of the effective diameter of the flow channel extensions 24, 26, 27 to reduce the Reynolds number.

Illustratively, the first end adapter 14 and/or the second end adapter 16 of the modular flow sensing assembly 10 may be interchangeable end adapters 14, 16 and may be selected from a group of interchangeable end adapters. In some cases, anywhere from two or more of each of the end adapters in the group of end adapters may have a different connection port configuration. The connection ports (e.g., a first connection port 28 that may be the connection port of the first end adapter 14 and a second connection port 30 that may be the connection port of the second end adapter 16) may exit a respective end adapter at a second end thereof (e.g., the first connection port 28 may exit the second end 14b of the first end adapter 14 and the second connection port 30 may exit the second end 16b of the second end adapter 16). The connection port configurations may include, for example, a male connection port 50, a female connection port 60, a manifold connection port 70, or any other similar or dissimilar connection port configuration, as desired.

In some instances, the first connection port 28 of the first end adapter 14 selected from a group of end adapters may be the same as the second connection port 30 of the second end adapter 16 selected from a group of end adapters. For example, the first connection port 28 may have a male connection port 50, and the second connection port 30 may have a male connection port 50. Alternatively, in another example, the first connection port 28 may have a female connection port 60 and the second connection port 30 may have a female connection port 60. Similarly and illustratively, the first connection port 28 may have any connection port configuration and the second connection port 30 may have the same connection port configuration as the first connection port 28.

In some cases, the configuration of the first connection port 28 of the first end adapter 14 may be different from the configuration of the second connection port 30 of the second end adapter 16. For example, the first connection port 28 may have a male connection port 50 or a female connection port 60, and the second connection port 30 may have the male connection port 50 configuration or the female connection port 60 configuration that is different than the connection port configuration of the first connection port 28. Similarly and illustratively, the first connection port 28 may have any connection port configuration, and the second connection port 30 may have any connection port configuration that is different than the first connection port configuration. For example, the first connection port 28 may have a male connection port configuration or a female connection port configuration, and the second connection port 30 may have the other of the male connection port configuration and the female connection port configuration that is not used by the first connection port 28.

One or more of the first end adapter 14 and the second end adapter 16 may include a manifold connection port 70 (e.g., a connection port having an elbow flow channel extension 27), as shown in FIGS. 1 and 4-6, and the other of the first end adapter 14 and the second end adapter 16 may comprise the manifold connection port 70, or a straight through connection port configuration (e.g., a straight through male connection port 50, a straight through female connection port 60, etc.) or any other connection port configuration. In some instances, the manifold connection port 70 may include an elbow flow channel extension 27 configured to change a flow direction one or more times internally to the main sense element assembly or the main sensor body 12. Such change in direction may ease the design requirements of a user's system and allow pneumatic effects due to directional change to be calibrated out of the sensor 20. In some instances, the elbow flow channel extension 27 may exit from the manifold connection port 70 through a side thereof (e.g., a bottom side, a top side, a front side, a back side, etc.).

The first connection port 28 and the second connection port 30, irrespective of the connection port configuration (e.g., male connection port 50, female connection port 60, manifold connection port 70, etc.), may have any type of system interface 36. For example, the first connection port 28 and the second connection port 30 may include a system interface 36 having threads (e.g., FIGS. 1-3), a ball and detent configuration, a pressure fit configuration (e.g., FIGS. 1, 7, and 8), a tube fitting and/or any other system interface configured to engage or connect to a system external to the modular flow sensing assembly 10, as desired.

In some instances, the first end adapter 14 and/or the second end adapter 16 may include one or more connector receiving elements 38 configured to connect or fasten the first end adapter 14 and/or the second end adapter 16 to one or more flow utilizing systems or other structures, where the connector receiving element(s) 38 may include one or more openings 40 for receiving a connector or fasteners. For example, the first end adapter 14 and/or the second end adapter 16 having any type of connection port (e.g., a male connection port 50, a female connection port 60, a manifold connection port 70, etc.) may include one or more connector receiving elements 38 defining one or more openings 40 configured to receive a connector (not shown) to fasten or connect the first end adapter and/or the second end adapter to a system (not shown), as shown in FIGS. 1-8.

In some illustrative cases, the modular flow sensing system may include one or more laminar flow elements 34 (hereinafter "LFE"), for example, a laminar flow enhancing element as shown in FIG. 1. In some instances, the LFE 34 may be configured to be positioned at least partially within the main housing 18 (e.g., within the flow channel 22 of the main housing 18), such that the LFE 34 may facilitate laminarizing and straightening a flow of fluid through the flow channel 22 of the main housing 18. In some cases, the LFE 34 may help create a pressure drop across the flow channel 22 extending from the first end 18a of the main housing 18 to the second end 18b of the main housing 18. This pressure drop or pressure differential may be dependent on the geometry of the LFE 34 and/or flow rate. Furthermore, the fluid in the flow channel 22 may have an increasingly turbulent flow as the flow rate of the fluid increases (e.g., an increasing non-uniform pressure and velocity across a given plan orthogonal to the direction of flow). To address an undesirable turbulent flow, the LFE, in addition to creating a pressure drop, may straighten and/or laminarize the flow in the flow channel 22, which may result in reducing the turbulence in the flow. Operatively, the LFE 34 may reduce the turbulence in the flow by forcing the fluid through openings in the LFE 34.

The modular flow sensing assembly 10 may be assembled in a modular manner or method 100. Illustratively, a main sense element assembly or main sensor body 12 that defines a flow channel 22 and has a sensor 20 may be obtained (step 110, FIG. 9) for use in the modular flow sensing assembly 10. In some instances, the flow channel 22 may extend from a first end 18a of a main housing 18 of the main sense element assembly or main sensor body 12 and across the sensor 20 to a second end 18b of the main housing 18. Further, the obtained main sense element assembly or main sensor body 12 may include a flow sensor configured to sense fluid flow through the flow channel 22 of the main sense element assembly or main sensor body 12.

Figure 9:
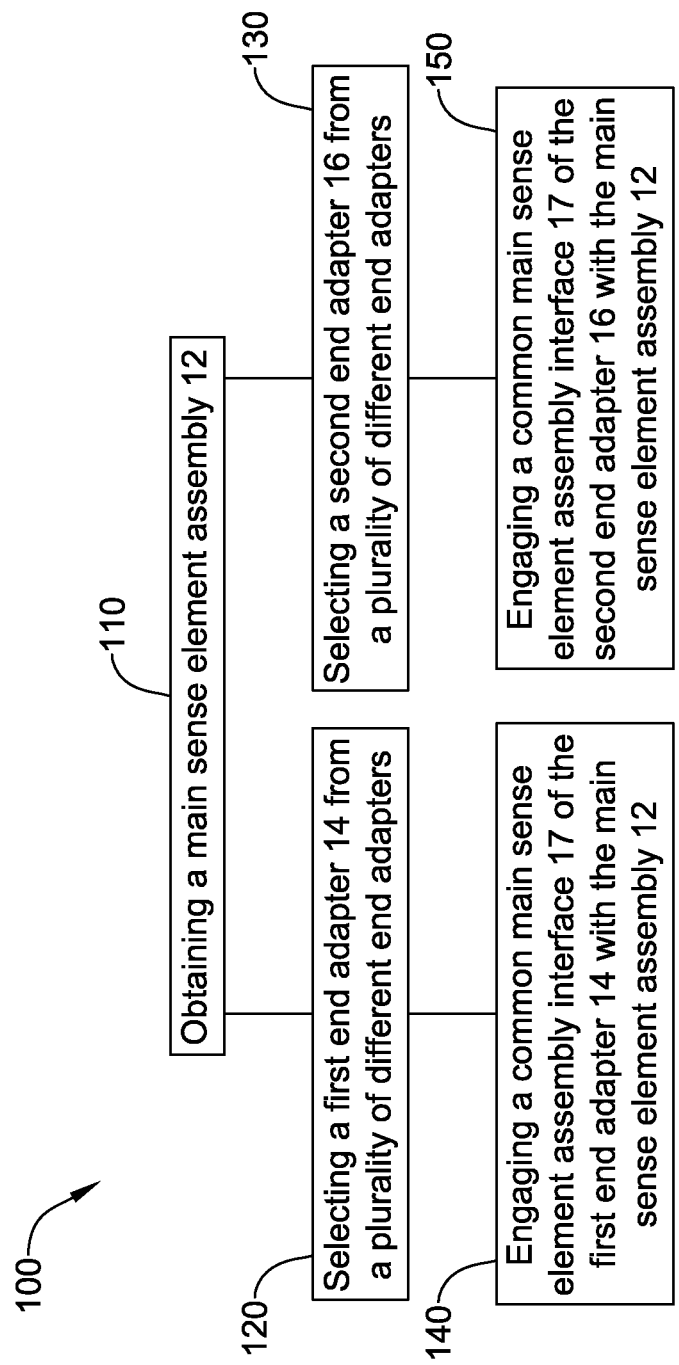
FIG. 9 is a schematic flow diagram of a method of assembling an illustrative modular flow sensing assembly.

In some instances, one or more of the first end adapter 14 and the second end adapter 16 may be selected from a plurality and/or group of different end adapters, where one or more of each of the plurality or group of different end adapters may have a common main sense element assembly interface 17, but different connection port configurations (step 120 and step 130, FIG. 9). In some cases, one or more or each of the plurality of different end adapters may be configured to extend the flow channel 22 of the sense element assembly or main sensor body 12 to a corresponding connection port (e.g., include a first flow channel extension 24 and/or a second flow channel extension 26). After the first end adapter 14 and/or the second end adapter 16 are/is selected from the plurality of end adapters, the common main sense element assembly interface 17 of the first end adapter 14 may be engaged with the main sense element assembly or main sensor body 12 and form a seal therebetween, and/or the common main sense element assembly interface 17 of the second end adapter 16 may be engaged with the main sense element assembly or main sensor body 12 and form a seal therebetween (step 140 and step 150, FIG. 9). In some cases, the connections or engagements between the common main sense element assembly interfaces 17 of the first end adapter 14 and the second end adapter 16, respectively, may extend the flow channel 22 of the main sense element assembly or main sensor body 12 to the first connection port 28 of the first end adapter 14 and/or the second connection port 30 of the second end adapter 16.

Optionally, prior to engaging, connecting, or securing one or more of the first end adapter 14 and the second end adapter 16 to the main sense element assembly or the main sensor body 12, the sensor 20 (e.g., flow sensor) in the main housing 18 may be calibrated, as desired. Alternatively, or in addition, after engaging, connecting, or securing one or more of the first end adapter 14 and the second end adapter 16 to the main sense element assembly or the main sensor body 12, the sensor 20 (e.g., flow sensor) in the main housing 18 may be calibrated, as desired. Where the sensor 20 (e.g., flow sensor) in the main housing 18 is calibrated after engaging, connecting, or securing one or more of the first end adapter 14 and the second end adapter 16 to the main sense element assembly or main sensor body 12, such post-assembly calibration may take place at a manufacturer prior to shipment of the modular flow sensing assembly 10 to a user and/or after shipment of the modular flow sensing assembly 10 to the user.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A modular flow sensor, comprising: a main sensor body including: a main housing having a first end and a second end, where the main housing defines a flow channel from the first end to the second end; a sensor configured to be received by the main housing for sensing fluid flowing through the flow channel of the main housing; a first end adapter configured to directly engage and form a seal with the main housing, the first end adapter defining a first flow channel extension that extends the flow channel of the main housing to a first connection port of the modular flow sensor; a second end adapter configured to directly engage and form a seal with the main housing, the second end adapter defining a second flow channel extension that extends the flow channel of the main housing to a second connection port of the modular flow sensor;

and wherein the first connection port has a different system interface than the second connection port.

2. The modular flow sensor of claim 1, wherein the first end adapter and the second end adapter are selected from a group of end adapters, wherein each end adapter has a different connection port configuration.

3. The modular flow sensor of claim 1, wherein the first connection port has a different connection port configuration than the second connection port.

4. The modular flow sensor of claim 3, wherein the first connection port has a male connection port configuration, and the second connection port has a female connection port configuration.

5. The modular flow sensor of claim 3, wherein the first connection port has a male connection port configuration, and the second connection port has a manifold connection port configuration.

6. The modular flow sensor of claim 1, wherein the first connection port has a threaded system interface, and the second connection port has a tube fitting system interface.

7. The modular flow sensor of claim 1, wherein the first connection port exits an end of the first end adapter, and the second connection port exits a side of the second end adapter.

8. The modular flow sensor of claim 1, wherein one or more of the first end adapter and the second end adapter includes one or more fins configured to precondition the flow prior to the flow entering the flow channel of the main housing.

9. The modular flow sensor of claim 8, wherein the one or more fins are configured to precondition the flow by straightening a direction of a flow velocity of the fluid flow.

10. The modular flow sensor of claim 3, wherein the first end adapter comprises an elbow manifold connection port configuration and the second end adapter comprises a straight-through connection port configuration with a threaded system interface.

11. The modular flow sensor of claim 1, wherein a flow direction is changed one or more times internally to the modular flow sensor.

12. The modular flow sensor of claim 1, further comprising:
a laminar flow enhancing element configured to be positioned at least partially within the main housing.

13. A modular flow sensor assembly, comprising: a main sense element assembly including a first end and an opposing second end with a flow channel extending through the main sense element assembly from the first end to the second end, the main sense element assembly having a side extending between the first end and the second end, the main sense element assembly further including a sensor for sensing fluid flow through the flow channel, the main sense element assembly further configured to receive one or more interchangeable end adapters, wherein each end adapter extends the flow channel of the main sense element assembly and defines a particular connection port configuration; and one or more of the interchangeable end adapters secured to the main sense element assembly, the one or more interchangeable end adapters forming at least a portion of an outer housing of the modular flow sensor apparatus that extends adjacent the side of the main sense element assembly and overlaps at least part of the side of the main sense element assembly.

14. The modular flow sensor assembly of claim 13, wherein each of the one or more interchangeable end adapters include a common main sense element assembly interface for engaging the main sense element assembly.

15. The modular flow sensor assembly of claim 13, wherein one or more of the interchangeable end adapters includes one or more fins configured to precondition the fluid flow prior to the fluid flow entering the flow channel of the main sense element assembly.

16. The modular flow sensor assembly of claim 13, wherein the main sense element is configured to be calibrated prior to receiving the interchangeable end adapters.

17. The modular flow sensor assembly of claim 13, wherein the one or more of the interchangeable end adapters include:
a first interchangeable end adapter defining a first connection port configuration; and
a second interchangeable end adapter defining a second connection port configuration, wherein the first connection port configuration is different from the second connection port configuration.

18. The modular flow sensor assembly of claim 17, wherein the first connection port configuration is a male connection port or a female connection port, and the second connection port configuration is a male connection port or a female connection port.

19. A method for assembling a flow sensor, comprising: obtaining a main sense element assembly that defines a flow channel from a first end to a second end of the main sense element assembly, wherein the main sense element assembly includes a side extending between the first end and the second end, the main sense element assembly also having a flow sensor for sensing fluid flow through the flow channel of the main sense element assembly; selecting a first end adapter from a plurality of different end adapters, wherein each of the plurality of different end adapters have a common main sense element assembly interface but a different connection port configuration, and wherein each of the plurality of different end adapters is configured to extend the flow channel of the main sense element assembly to a corresponding connection port; selecting a second end adapter from the plurality of different end adapters; engaging the common main sense element assembly interface of the first end adapter with the main sense element assembly to extend the flow channel of the main sense element assembly to the connection port of the first end adapter, the first end adapter having a first end configured to engage the first end of the main sense element assembly and to extend along the side of the main sense element assembly to cover at least part of the side of the main sense element assembly; and engaging the common main sense element assembly interface of the second end adapter with the main sense element assembly to extend the flow channel of the main sense element assembly to the connection port of the second end adapter, the second end adapter having a first end configured to engage the second end of the main sense element assembly and to extend along the side of the main sense element assembly to overlap at least part of the side of the main sense element assembly.

20. The method of claim 19, further comprising:
calibrating the flow sensor before engaging the first end adapter and second end adapter.

* * * * *